(12) United States Patent
Ozkan

(10) Patent No.: US 10,715,597 B2
(45) Date of Patent: Jul. 14, 2020

(54) METHODS AND SYSTEMS TO CREATE A NETWORK-AGNOSTIC SDN-BASED CLOUD GATEWAY FOR CONNECTIVITY TO MULTIPLE CLOUD SERVICE PROVIDERS

(71) Applicant: AT&T Intellectual Property I, L.P., Atlanta, GA (US)

(72) Inventor: Mehmet Ozkan, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 157 days.

(21) Appl. No.: 15/625,792

(22) Filed: Jun. 16, 2017

(65) Prior Publication Data

US 2018/0367609 A1    Dec. 20, 2018

(51) Int. Cl.
G06F 15/16    (2006.01)
H04L 29/08    (2006.01)
H04W 88/16   (2009.01)

(52) U.S. Cl.
CPC ........ H04L 67/1097 (2013.01); H04L 67/327 (2013.01); *H04W 88/16* (2013.01)

(58) Field of Classification Search
CPC ........ B22F 2998/00; B22F 5/085; B22F 5/08; H04L 67/1097; H04W 88/16
See application file for complete search history.

(56) References Cited

U.S. PATENT DOCUMENTS

| | | | |
|---|---|---|---|
| 8,578,076 B2 | 11/2013 | van der Linden et al. | |
| 9,473,365 B2 | 10/2016 | Melander et al. | |
| 9,531,814 B2 | 12/2016 | Cardona-Gonzalez et al. | |
| 9,584,439 B2 | 2/2017 | Leafe et al. | |
| 9,584,445 B2 | 2/2017 | Stubberfield et al. | |
| 9,843,624 B1* | 12/2017 | Taaghol | H04L 67/10 |
| 9,948,544 B2* | 4/2018 | Strijkers | H04L 67/34 |

(Continued)

FOREIGN PATENT DOCUMENTS

| | | | |
|---|---|---|---|
| WO | WO 2007/116411 A1 | 10/2007 | |
| WO | WO 2016/044413 A1 | 3/2016 | |

OTHER PUBLICATIONS

Boussard et al.; "Software-Defined LANs for Interconnected Smart Environments"; 27th Int'l IEEE Teletraffic Congress; 2015; 9 pages.

(Continued)

*Primary Examiner* — Moustafa M Meky
*Assistant Examiner* — Thorne E Waugh
(74) *Attorney, Agent, or Firm* — BakerHostetler

(57) ABSTRACT

Network-agnostic SDN-based cloud gateways are adapted for connecting a customer's SD cloud gateway to multiple cloud service providers (CSPs). A dynamic, on-demand, software defined, policy based cloud connectivity gateway is created for all kinds of networks and end points that can be used to connect to multiple CSPs at the same time from a single user interface. Network capacity on both the customer gateway and CSP connection points are adjusted through a user interface based on predefined policies such as automatic increasing of network connections based on actual cloud usage, limiting network capacity on a certain link based on time, application, and other conditions, and distributing traffic and changing the routing based on predetermined policies such as time of day, utilization, and performance.

20 Claims, 11 Drawing Sheets

(56) References Cited

U.S. PATENT DOCUMENTS

| | | |
|---|---|---|
| 2013/0215215 A1* | 8/2013 | Gage ................... H04N 7/152 |
| | | 348/14.08 |
| 2015/0124823 A1 | 5/2015 | Pani et al. |
| 2015/0244771 A1 | 8/2015 | Pasdar et al. |
| 2015/0263902 A1 | 9/2015 | He et al. |
| 2015/0365288 A1 | 12/2015 | Van Der Merwe et al. |
| 2016/0057098 A1 | 2/2016 | Han et al. |
| 2016/0062746 A1* | 3/2016 | Chiosi ................ H04L 41/5048 |
| | | 717/104 |
| 2016/0094483 A1 | 3/2016 | Johnston et al. |
| 2016/0269482 A1* | 9/2016 | Jamjoom ............ H04L 67/1095 |
| 2016/0301779 A1 | 10/2016 | Cui et al. |
| 2016/0344590 A1 | 11/2016 | Huey et al. |
| 2016/0344687 A1 | 11/2016 | Rong et al. |
| 2017/0019302 A1 | 1/2017 | Lapiotis et al. |
| 2017/0063648 A1 | 3/2017 | Nadaf et al. |
| 2017/0097841 A1 | 4/2017 | Chang et al. |
| 2017/0099188 A1 | 4/2017 | Chang et al. |
| 2018/0139129 A1* | 5/2018 | Dowlatkhah ........... H04L 45/64 |

OTHER PUBLICATIONS

Hakiri et al.; "Leveraging SDN for The 5G Networks: Trends, Prospects and Challenges"; Networking and Internet Architecture; 2015; 23 pages.

* cited by examiner

FIG. 4C

METHODS AND SYSTEMS TO CREATE A NETWORK-AGNOSTIC SDN-BASED CLOUD GATEWAY FOR CONNECTIVITY TO MULTIPLE CLOUD SERVICE PROVIDERS

TECHNICAL FIELD

Systems and methods for creating a network-agnostic, dynamic, on demand, software defined, policy based cloud connectivity gateway are used to connect any kind of network to multiple cloud service providers and/or multiple clouds based on pre-defined user-defined policies, regardless of where they are located.

BACKGROUND

Virtualization and cloud technologies have change the IT consumption model fundamentally in recent years. Today, small or large, almost all businesses use a form of cloud computing. Although the adoption started first as in-house "public cloud" deployments in the form of server virtualization for large enterprises, public clouds are becoming inevitable due to the ongoing major shift towards SaaS business models in the software industry and its large players, such as Microsoft and its cloud based Office 365 suite. For current enterprises, cloud adoption is now a matter of "when" rather than "if."

For public cloud access, two models prevail. In the first, the internet is used at the transmission medium and the data is usually encrypted. In the second, a private, closed network, such as a Virtual Private Network (VPN) is used.

One of the essential benefits of public cloud services is the flexibility, agility and on-demand or pay as you go nature of the services offered. Therefore, it is important to have similar characteristics for the cloud connectivity and the underlying network resources end to end; otherwise, the network itself becomes the bottleneck and barrier for the expected benefits of the public cloud services model. Although there are Software Defined Network (SDN)-based cloud connectivity solutions that provide such cloud connectivity, to date such services mostly rely on underlying private network connections, use Multiprotocol Label Switching (MPLS) networks as the transmission medium, and work with a single cloud service provider at a time. This approach has limitations in that it does not address customers using other type of networks, does not allow managing multiple Cloud Service Providers (CSPs) at the same time from the same management environment, and does not allow users to determine usage and traffic policies for multiple CSPs.

As an example, AT&T's Netbond solution is an industry leading SDN-based cloud connectivity solution that allows users to connect their AT&T VPN to a CSP. However, Netbond works on the AT&T MPLS VPN (AVPN) as the underlying network and is designed to connect the customer's network to one CSP at a time. These features of Netbond create a challenge when it comes to selling it to customers who do not have AVPN as their primary network. To overcome this challenge, a single node AVPN connection can be created that provides connectivity to Netbonded CSPs. However, when such a connectivity solution is designed with traditional routers and circuits, it does not provide the required agility, flexibility and on demand capabilities, making the gateway itself a bottleneck for the whole architecture.

For example, FIG. 1 illustrates a high level on-demand gateway architecture 10 for access by third party network 12 using AT&T's Netbond 14 as a secure gateway from the customer premises equipment 16 to the cloud ecosystem including, for example, CSPs 18. Netbond 14 provides a single secure physical connection to the CSP 18 and a secure connection to the customer network utilizing SDN that virtualizes the physical circuit and configures the gateway using uCPE, for example. Utilizing a virtualized and SDN based connectivity solution such as AT&T's uCPE and AVPN on demand provides the required flexibility and agility for the cloud connectivity. However, the end user/enterprise customer can only configure the gateway and the CSP connections individually and independently, but not together. Also, such a connectivity solution does not allow for policy based automated routing and capacity allocation/distribution among multiple CSPs as capacity monitoring and adjustments are made manually for each node (customer gateway and Netbond interfaces) continuously and cannot be automated.

Current carrier grade cloud connectivity solutions (such as Netbond) thus allow users to connect their networks to a single cloud at a time using only certain type of networks (such as MPLS). Current solutions for cloud connectivity only work with a single cloud service provider (CSP) at a time. Currently, no VPN connects networks of any type to multiple CSPs with multiple usage policies via multiple connections or monitors usage and applies traffic policies between CSPs. Rather, the existing solutions replace conventional routers and circuits with counterpart SDN functionality. The prior art thus fails to address customers using networks other than MPLS and does not allow the management of multiple CSPs at the same time or management from the same environment with multiple usage policies.

It is thus desirable to develop systems and methods that enable the creation of network agnostic, dynamic, on demand, software defined, policy based cloud connectivity gateways that can be used to connect any kind of network to multiple cloud service providers and cloud networks based on pre-defined user defined policies, regardless of where they are located. The systems and methods described herein address these and other needs in the art.

SUMMARY

The disclosed systems, methods, and apparatuses address the needs in the art by providing network-agnostic SDN-based cloud gateways adapted for connectivity to multiple CSPs. In particular, the disclosed systems, methods, and apparatuses create a dynamic, on-demand, software defined, policy based cloud connectivity gateway for all kinds of networks and end points that can be used to connect to multiple CSPs as the same time from a single user interface. The disclosed systems, methods, and apparatuses also allow for the adjustment of network capacity on both the customer gateway and CSP connection points based on predefined policies such as automatic increasing of network connections based on actual cloud usage, limiting network capacity on a certain link based on time, application, and other conditions, and distributing traffic and changing the routing based on predetermined policies such as time of day, utilization, and performance.

The systems, methods, and apparatuses described herein provide such connectivity by specifying the details of a totally software driven cloud gateway that allows the end user to define a policy based, automatic and dynamic bandwidth allocation, and distribution and routing based on predefined criteria set among the CSPs which are also connected via a software-defined, virtualized interface, such as AT&T's Netbond. When bundled with a compatible virtualized, SDN-based CPE device, the disclosed systems, methods, and apparatuses will extend cloud connectivity solutions to non AVPN customers, regardless of their location, as long as they have access to the Internet. Although a private connection to the VPN service is desired, an IP tunnel between the end user and VPN can also be employed, using the Internet as the transmission medium, as long as the Internet connection provides the required bandwidth capacity. The systems, method, and apparatuses disclosed herein can also be used to distribute certain traffic originating from a location or a gateway such as a datacenter to multiple CSPs based on pre-defined policies.

From the customers' perspectives, the end product will look like a single plug and play customer premises equipment (CPE) device that permits the customers to connect to a large CSP ecosystem through a single management portal via user-defined, automated policies, no matter what kind of network the respective customers have. A software defined cloud gateway is positioned at any customer location. This way cloud usage policies for each location can be defined individually. Customers also will be able to define cloud usage policies based on their business needs. For example, the customers may assign their bandwidth/network resources to a first CSP during the business hours for an Enterprise Resource Planning (ERP) application and then re-assign the available bandwidth to a second CSP after the business hours for backup purposes, on a daily basis and automatically. Also, for global, multi-national companies, bandwidth may be adjusted automatically for different time zones and different holiday and work day schedules.

In exemplary embodiments, a software defined, policy based cloud connectivity gateway and associated connectivity method and computer readable storage media for storing instructions for implementing such a method are provided. The cloud connectivity gateway is adapted to connect a customer data network to multiple cloud service providers and/or multiple cloud networks via a data network based on predefined user-defined policies. The cloud connectivity gateway includes a customer software defined cloud gateway adapted to connect the customer data network to the data network, cloud software defined cloud gateways adapted to connect the data network to each of the multiple cloud service providers and/or multiple cloud networks, and a plurality of software defined network controllers adapted to control data flow over the data network. A controller is also provided that is adapted to receive customer-selected policy and configuration data from a customer and to provide the customer-selected policy and configuration data to the customer software defined cloud gateway, cloud software defined cloud gateways, and software defined network controllers to configure the customer software defined cloud gateway, cloud software defined cloud gateways, and software defined network controllers to create respective virtual networks controlled by the customer-selected policy data between the customer data network and at least two of the multiple cloud service providers and/or multiple cloud networks. A user interface is also provided to enable the customer to provide the customer-selected policy and configuration data to the controller.

In exemplary embodiments, the user interface is adapted to enable the customer to select a configuration for the customer software defined cloud gateway. In such case, the configuration data includes at least a bandwidth capacity and bandwidth consumption model of a connection between the customer data network and the data network. The user interface is also adapted to enable the customer to select a configuration for each of the cloud software defined cloud gateways. In this case, the configuration data includes at least a bandwidth capacity and bandwidth consumption model of a connection between a corresponding cloud service provider and/or cloud network and the data network. In other exemplary embodiments, the user interface is adapted to enable the customer to select a cloud usage policy for each cloud service provider and/or cloud network and to provide the customer-selected policy data to the customer software defined cloud gateway, cloud software defined cloud gateways, and software defined network controllers. In this case, the customer-selected policy data may include time-based policy enforcement data that is provided to the customer software defined cloud gateway, cloud software defined cloud gateways, and software defined network controllers to enable dynamic changing of connectivity to the multiple cloud service providers and/or multiple cloud networks based on time interval.

In other exemplary embodiments, the customer-selected policy data includes cloud service provider or cloud network selection and bandwidth selection data that enables the customer software defined cloud gateway, cloud software defined cloud gateways, and software defined network controllers to configure the data network to divide simultaneous data traffic from the customer data network across multiple cloud service providers or cloud networks with the same policy data.

In additional exemplary embodiments, the customer-selected configuration data includes IP addresses, bandwidth capacity and routing configuration and is provided to a virtual router of the customer software defined cloud gateway and/or the cloud software defined cloud gateways. The customer-selected configuration data may also include access control lists, allowed and/or banned IP addresses, ports, and application data and is provided to a virtual firewall of the customer software defined cloud gateway and/or the cloud software defined cloud gateways.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Aspects of the herein described systems, methods, and apparatuses for cloud connectivity are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

FIGS. 4A-4C illustrate sample screen shots of the user control interface for configuring the home cloud gateway, cloud connectivity, and cloud usage policy, respectively.

DETAILED DESCRIPTION

The systems and methods described herein may be understood more readily by reference to the following detailed description taken in connection with the accompanying figures and examples, which form a part of this disclosure. It is to be understood that the systems and methods are not limited to the specific products, methods, conditions or parameters described and/or shown herein, and that the terminology used herein is for the purpose of describing particular embodiments by way of example only and is not intended to be limiting. Similarly, any description as to a possible mechanism or mode of action or reason for improvement is meant to be illustrative only, and the systems and methods described herein are not to be constrained by the correctness or incorrectness of any such suggested mechanism or mode of action or reason for improvement. Throughout this text, it is recognized that the descriptions refer both to methods and systems/software for implementing such methods.

A detailed description of illustrative embodiments will now be described with reference to FIG. 2-9. Although this description provides a detailed example of possible implementations, it should be noted that these details are intended to be exemplary and in no way delimit the scope of the subject matter described herein.

Figure 1:
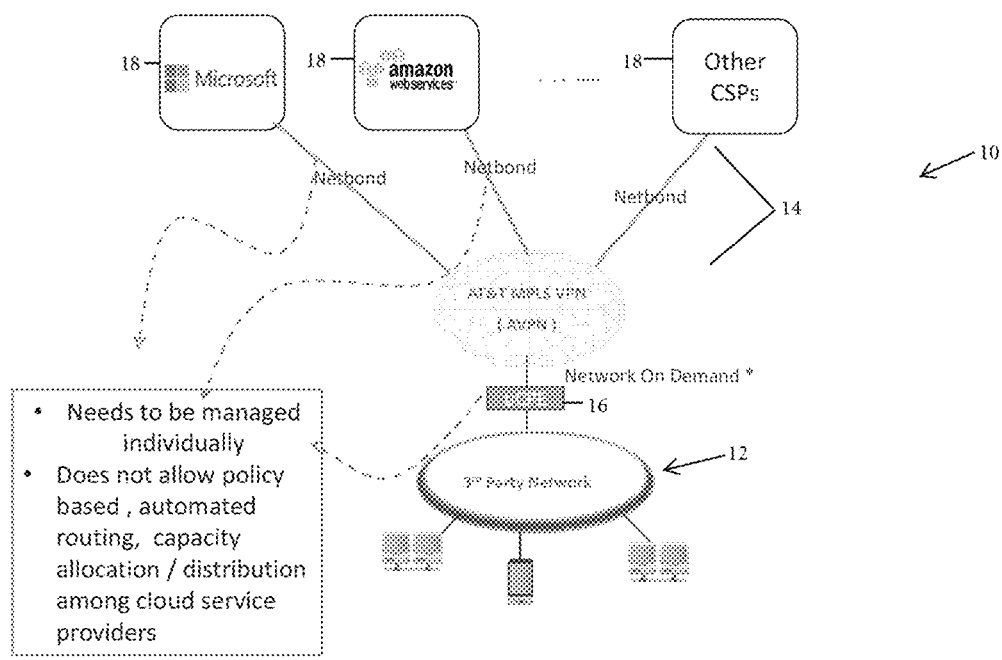
FIG. 1 illustrates a high level diagram of a prior art system that provides a secure on-demand cloud gateway architecture from the customer premises equipment to the cloud ecosystem.
Figure 2:
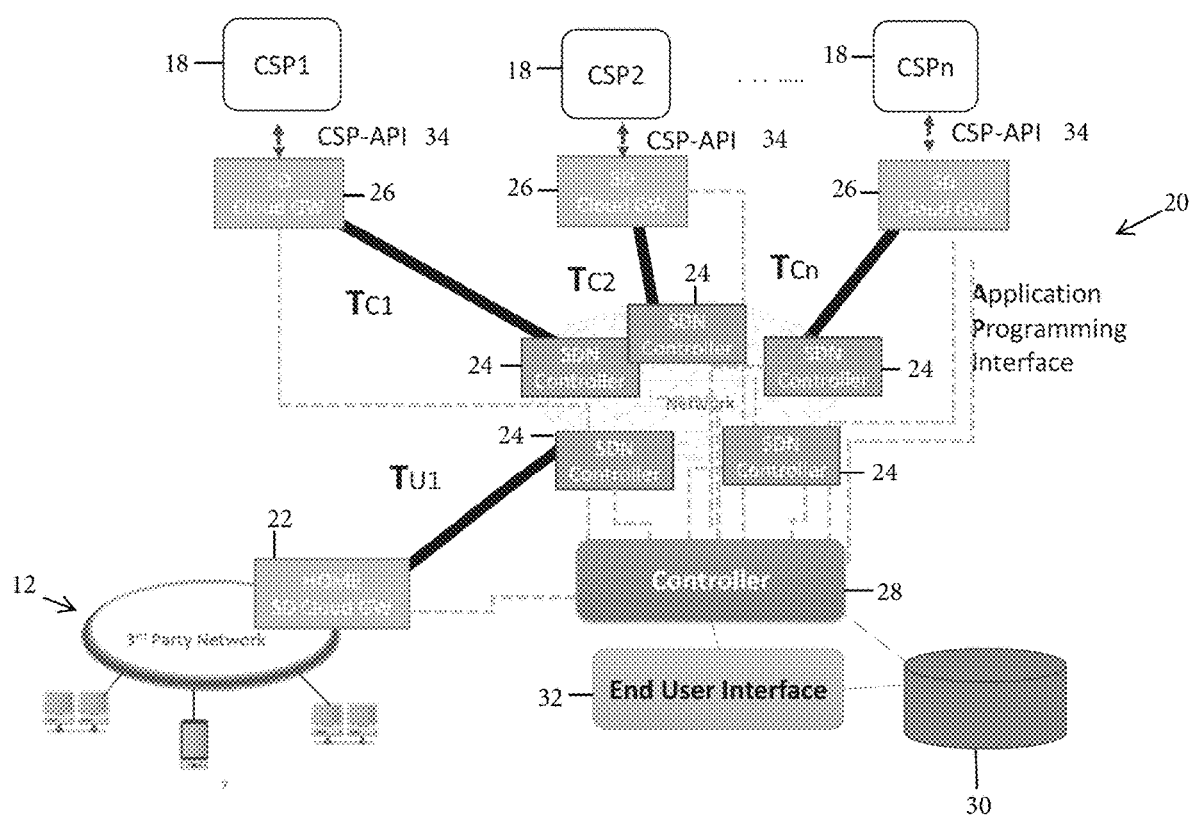
FIG. 2 illustrates a high level architecture of a network agnostic, dynamic, on demand, software defined, policy based cloud connectivity gateway in accordance with an exemplary embodiment.

FIG. 2 illustrates a high level architecture of a network agnostic, dynamic, on demand, software defined, policy based cloud connectivity gateway in accordance with an exemplary embodiment. As illustrated, an end user's third party network 12 is connected securely to respective CSPs 18 via the architecture 20 without requiring a secure network. The architecture 20 is implemented as an SDN in an exemplary embodiment that virtualizes a home gateway 22 that plugs into the end user's third party network 12 using a conventional hardware-based consumer premises equipment (CPE) running the SD cloud gateway software. On the other hand, the CPE could be a virtual CPE that generates a hardware or hypervisor that, in turn, runs the SD cloud gateway software. The SD home cloud gateway 22 is, in turn, connected to a corresponding SDN controller 24 that configures the network based on the provided user-configured connectivity policies pushed to the SDN controllers 24 from the controller 28. The SDN controller 24 configures the connectivity to respective CSPs 18 via respective virtualized cloud gateways 26. As explained in more detail below with respect to FIG. 3, a controller 28 is provided to each customer for controlling the connectivity and the traffic of customer (TU1) as well as the traffic of the respective cloud providers (TC1, TC2, . . . TCn) between the customer's virtualized home cloud gateway 22 and the respective CSPs 18. The customer's network configurations and policies are selected from database 30 and provided to controller 28 via the end user interface 32 that provides an API to the respective components for configuring the home cloud gateway 22, cloud connectivity, and cloud usage policies, respectively. In exemplary embodiments, the CSPs 18 are also provided with Application Programming Interfaces (APIs) 34 for enabling the CSPs to control the virtualized cloud gateways 26. The APIs 34 are used to ensure that the network configuration is appropriate for the configurations at the respective CSPs 18.

In exemplary embodiments, the architecture of FIG. 2 gives the customer access via controller 28 to all SDN controllers 24 and virtualized cloud gateways 22 and 26 at the same time to enable the controller 28 to create respective VPNs between the home cloud gateway 22 and the respective virtualized cloud gateways 26 on the network based on which CSP or CSPs 18 is/are selected by the customer at any given time. In exemplary embodiments, Netbond or other conventional connectivity solutions may be used to control both ends of traffic between the SDN controllers 24 and virtualized cloud gateways 26 and/or home cloud gateway 22 under control of the configurations and policies provided by the customer via controller 28.

In FIG. 2, all devices are physically installed and have IP connectivity at their respective locations. Once installed, transferring the configurations including the link capacities and the like to the respective devices from the controllers and software defined devices is based on available conventional Software Defined Networking Network Function Virtualization (SDN-NFV) methods such as orchestration. As known to those skilled in the art, orchestration can communicate with all of the SDN controllers 24 as well as the SD cloud gateways 22 and 26 to push the configuration data within the extant SDN protocol stack. Based on policies, the orchestration element of the controller 28 can push the configuration data to each SDN controller 24 and SD cloud gateway 22 and 26 so that each element can configure the underlying network. Such techniques are well-known to those skilled in the art and will not be elaborated upon here.

Figure 3:
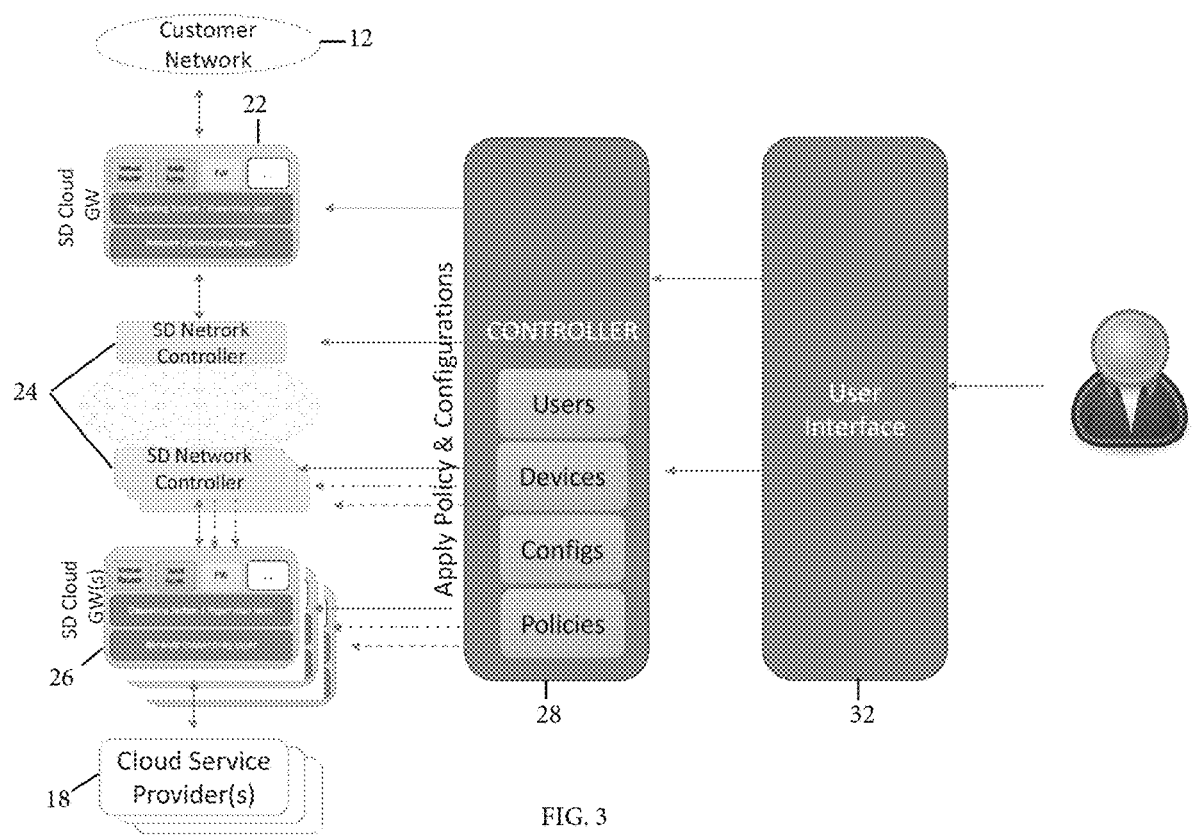
FIG. 3 illustrates a user control interface to the architecture of FIG. 2.
Figure 4A:
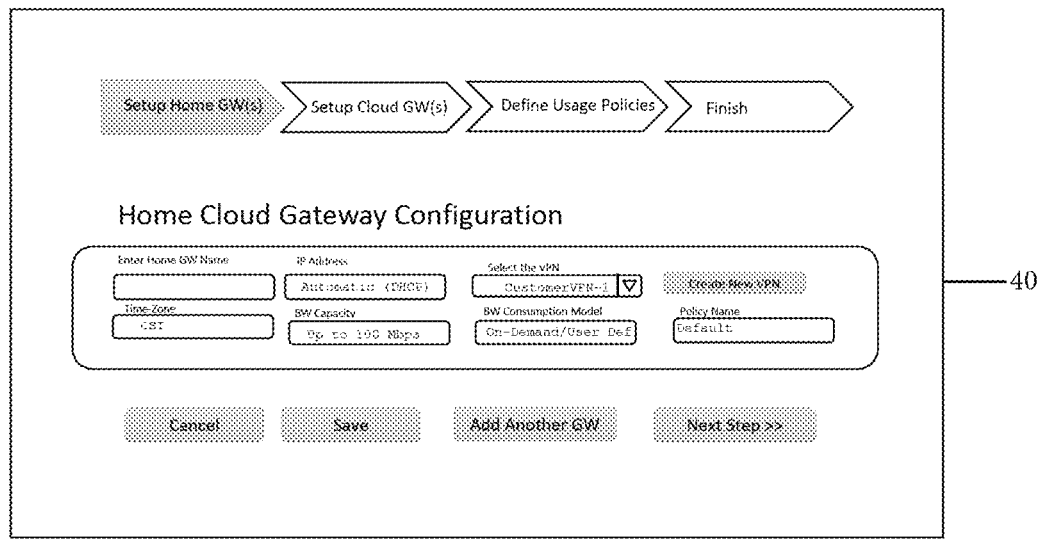
Figure 4B:
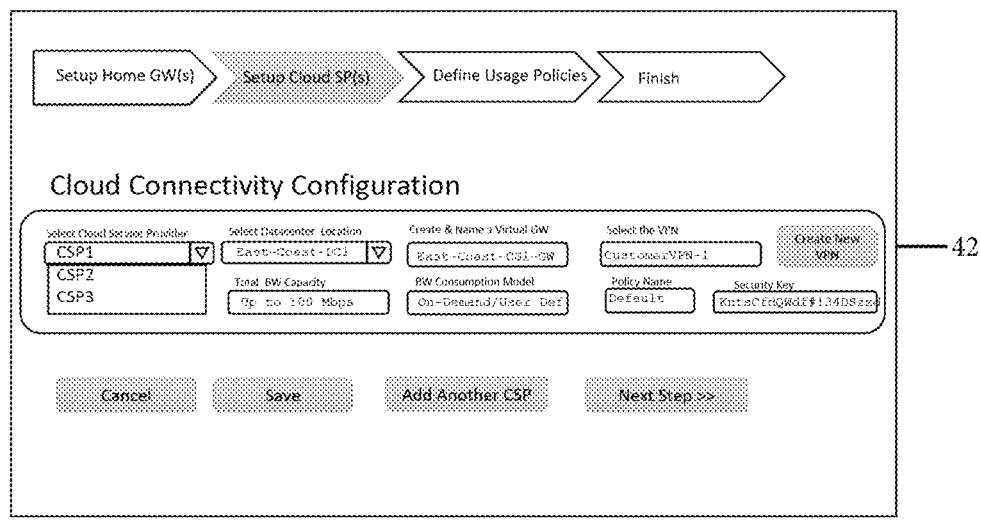
Figure 4C:
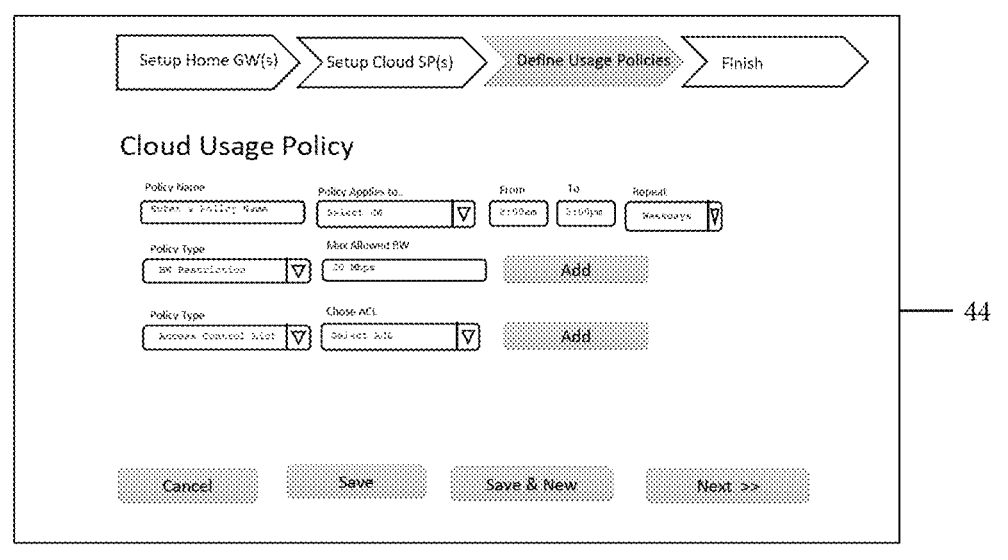
Figure 5:
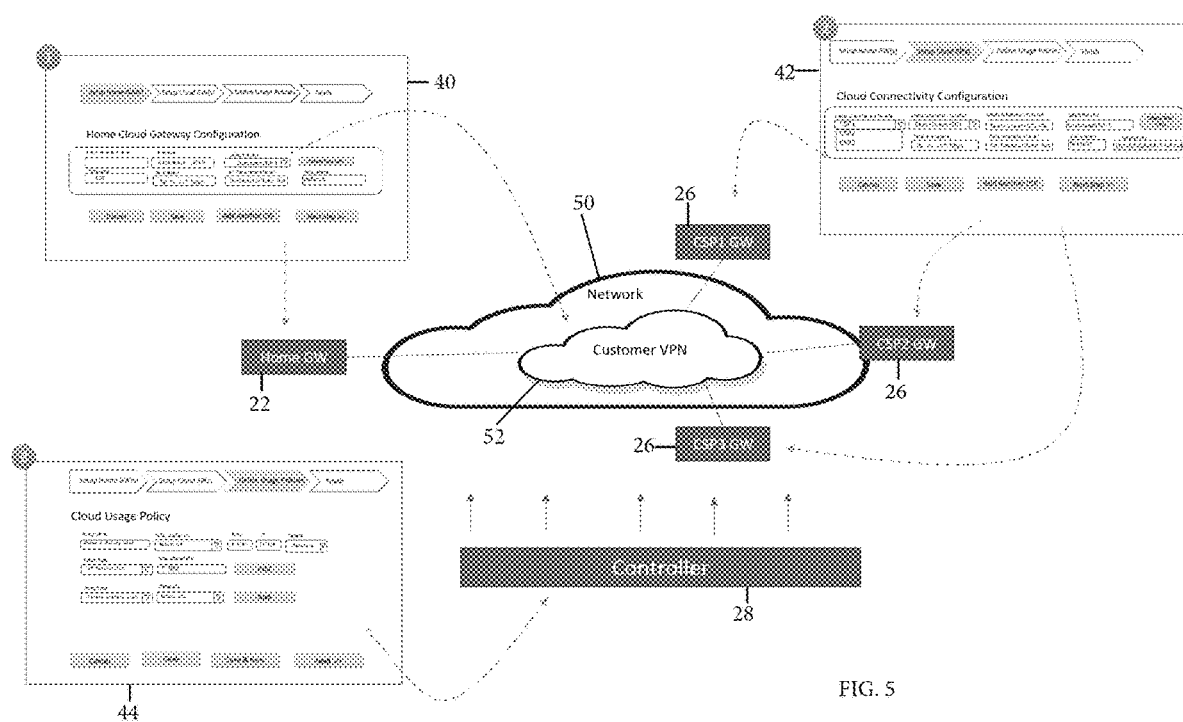
FIG. 5 illustrates how the user configurations are applied to the architecture of FIG. 2 in an exemplary embodiment.

FIG. 3 illustrates a user control interface to the architecture of FIG. 2. At a high level, the customer/end user is given access to a control panel interface (i.e., web-based control panel) via end user interface 32. The customer creates a software-defined cloud gateway 22 for the customer's home location of its network 12 and determines the required parameters for the software-defined cloud gateway 22, such as gateway name, IP address, physical location, and required bandwidth capacity. As shown in FIG. 4A, the control panel interface 40 for the cloud gateway 22 also enables the customer to select a VPN or create a new VPN, to select the time zone, to select the bandwidth consumption model (e.g., on-demand), and to specify which set of policies to apply for the desired data flow. Also, the customer may designate destination CSPs 18 and assign initial bandwidth capacity for each designated CSP 18. Those skilled in the art will appreciate that the total assigned bandwidth capacity cannot exceed the capacity of the software-defined cloud gateway 22 (i.e., Tu≥Tc1+Tc2+ . . . +Tcn). As shown in FIG. 4B, the control panel interface 42 for the cloud connectivity further enables the customer to select the datacenter location, to create and name a virtual gateway, to select or create a new VPN, to select the bandwidth consumption model (e.g., on-demand), to specify which set of policies to apply for the desired data flow, and to select a security key, which may be randomly generated. As shown in FIG. 4C, the control panel interface 44 for selecting the cloud usage policy enables the customer to select the policy name and type, what the policy applied to, time duration of application of the policy and whether the time interval is repeated, the maximum allowed bandwidth, the Access Control List (ACL) to use, and the like. FIG. 5 illustrates how the user configurations selected using control panel interfaces 40, 42, and 44 are applied to the architecture of FIG. 2 in an exemplary embodiment.

Figure 6:
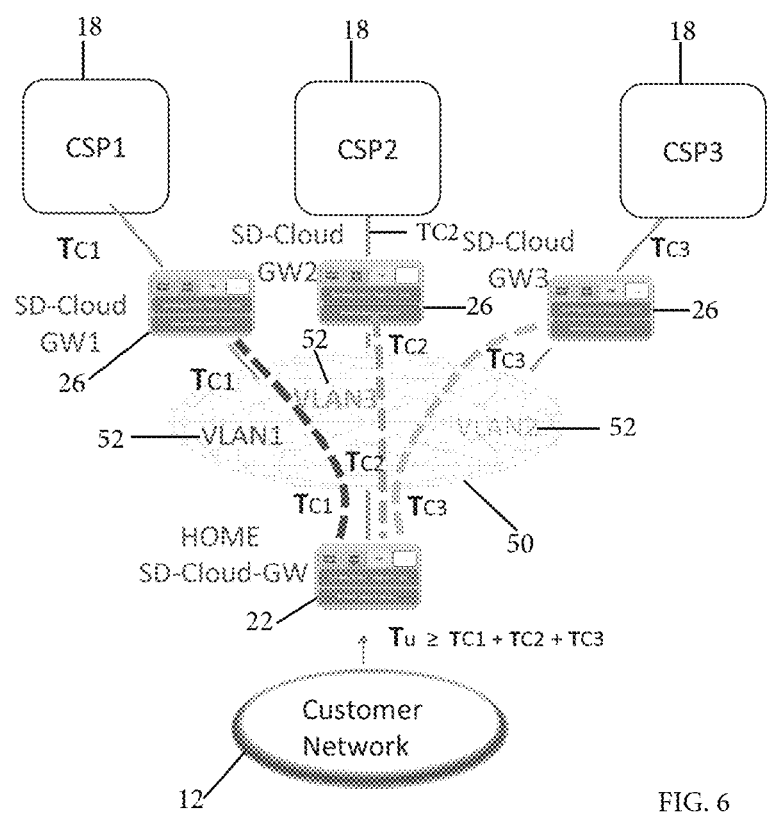
FIG. 6 illustrates the creation of separate VLANs between the customer gateway at the customer's location and each gateway located at each CSP connectivity point with default router configuration policies at each gateway.

During use, the user interface module 32 transfers the entered configurations and policies data for respective users and devices to the controller 28 which, in turn, configures the network elements 22, 24, 26 of network 50 by enforcing the specified configurations on SD cloud gateways 22, SDN controllers 24, and SD cloud gateways 26 using the extant APIs, i.e., by using industry standard SDN, NFV protocol stacks. In particular, the controller 28 pushes out configuration data to each SDN controller 24 to configure the network devices remotely based on the policies and configuration data provided by the customer to create separate VLANs 52 between the SD cloud gateway 22 at the customer's location and each CSP SD cloud gateway 26 located at the CSP connectivity point for each designated CSP 18 with the assigned bandwidth capacities by enforcing the default router configurations on each SD cloud gateway 26 as illustrated in FIG. 6. It will be appreciated that network 50 need not be limited to a MPLS network but may be any suitable network in exemplary embodiments.

FIG. 6 illustrates the creation of separate VLANs 52 between the SD cloud gateway 22 at the customer's location and each SD cloud gateway 26 located at each CSP connectivity point with default router configuration policies at each SD cloud gateway 26. As illustrated, the customer traffic Tu of the customer network 12 is assigned to the SD cloud gateway 22 and respective VLANs 52 with CSP traffic TC1, TC2, TC3 for respective CSPs 18 labeled as CSP1, CSP2, CSP3 (where Tu≥TC1+TC2+TC3). The VLANs 52 terminate at the respective SD cloud gateways 26 of the respective CSPs 18 as illustrated.

In an exemplary allocation, the customer may pay for 100 Mbps total (Tu=100 Mbps) and allocate 50 Mbps to CSP1 (TC1=50 Mbps), 30 Mbps to CSP2 (TC2=30 Mbps), and 20 Mbps to CSP3 (TC3=20 Mbps). When the controller 28 pushes this policy, the SD cloud gateway 22 of the customer and the SD controllers 24 configure three different virtual connections on the same circuit for each circuit flow. Then, the SD controller 24 configures the underlying network (e.g., MPLS) and creates three different virtual LANs on the MPLS so that the circuits can be separated from each other and rerouted to each CSP 18 with the different allocated network policies (e.g., different bandwidth policies, time-based policies, security policies, and the like). In exemplary embodiments, the network orchestrator in the SDN-NFV network determines what type of configuration changes are needed based on the pushed policies and pushes the configuration changes at the same time so that the network is ready for the new policies.

The controller 28 for each customer includes a policy engine as a software module that stores and pulls the user defined policies to/from a database 30 (FIG. 2) for each network 50 for corresponding time periods and enforces the policies to the SD cloud gateways 22 and 26 along with the SDN controllers 24. In exemplary embodiments, the network policies define the bandwidth capacities to be allocated on each connection and gateway and the traffic flow rules based on utilization, performance, time of day, originating user, origination location, application network port, priority, and the like. The customer defined policies are then enforced to the SD cloud gateways 26 by the SDN controllers 24 in the conventional fashion for SDN-NFV network configurations. Those skilled in the art will appreciate that SDN-NFV is a global open standard defining how SDN controllers and other network elements may be virtualized and controlled. In exemplary embodiments, such SDN controllers implement policies specifying time-based bandwidth capacity, firewall policies, and routing enforcement policies.

Figure 7:
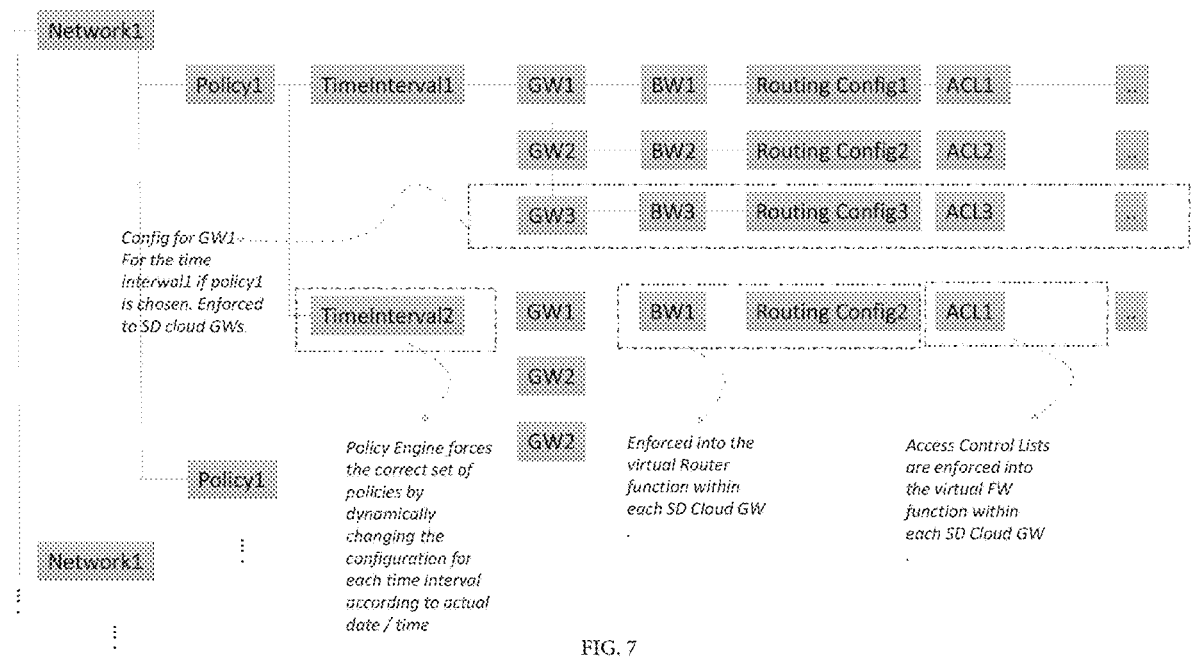
FIG. 7 illustrates application of time-based policy enforcement to the architecture of FIG. 2.

By way of example, FIG. 7 illustrates application of time-based policy enforcement to the architecture of FIG. 2. In this example, a customer VPN 52 (Network1) implements a policy (Policy 1) that specifies different network configurations for different times of day or of the week (TimeInterval1 and TimeInterval2). As illustrated, the policy engine of controller 28 pushes the correct set of policies to the respective network components by dynamically changing the configuration for each time interval according to the current date and time and pushes the configuration out to the respective network elements. In the example illustrated in FIG. 7, the configuration for gateway 3 (GW3) is chosen for TimeInterval1 if Policy1 is chosen and enforced to the SD cloud gateways 26. The selected bandwidth (e.g. BW3) is enforced into the virtual router function within each SD cloud gateway 26. Similarly, the Access Control Lists (ACL3) are enforced into the virtual firewall function within each SD cloud gateway 26. Similarly during TimeInterval2, gateway 1 (GW1) is chosen if Policy1 is chosen and enforced to the SD cloud gateways 26. The selected bandwidth (e.g. BW1) is enforced into the virtual router function within each SD cloud gateway 26 and, the Access Control Lists (ACL1) are enforced into the virtual firewall function within each SD cloud gateway 26.

To illustrate implementation of such time-based policies in a practical embodiment, assume that 1000 employees work in an office having two CSPs: one is Amazon and the other is Microsoft. During the day from 9 am to 5 pm, the employees use Office 365 Cloud from Microsoft. However, after 5 pm, the customer wishes to backup servers using Amazon Web Services. The systems and method disclosed herein permit the implementation of policies whereby the data traffic may be allocated dynamically from Office 365 Cloud to Amazon Web Services after 5 pm.

Figure 8:
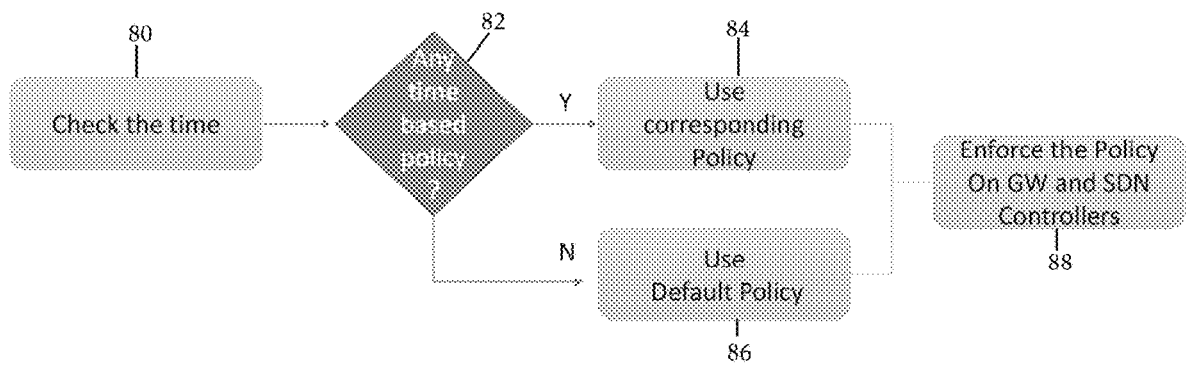
FIG. 8 illustrates a simplified flow chart of application of time-based policies to the architecture of FIG. 2.

FIG. 8 illustrates a simplified flow chart of application of time-based policies to the architecture of FIG. 2. As illustrated, the processor of the controller 28 implements the time-based policies by checking the time at 80 and, if it is determined at 82 that time-based policies are being implemented, then the corresponding time-based policy is implemented at 84. If no time-based policy is being implemented, then the default policy is implemented at 86. The appropriate policy is then enforced on the SD cloud gateways 22 and 26 and SDN controllers 24 at 88. Similar techniques are used to implement other types of polices as will be apparent to those skilled in the art.

Figure 9:
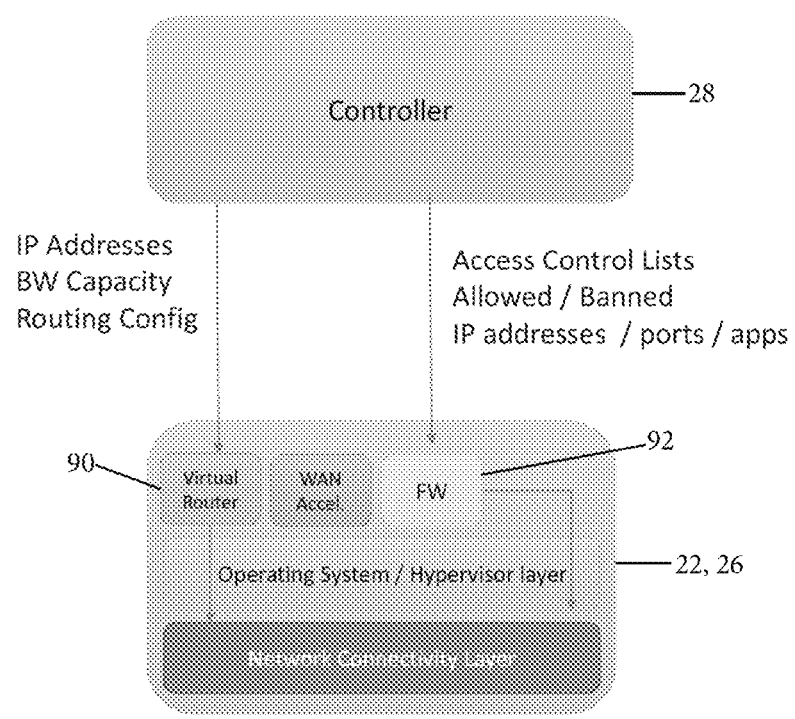
FIG. 9 illustrates policy enforcement for virtual router and virtual firewall modules in an exemplary embodiment.

FIG. 9 illustrates policy enforcement for virtual router and virtual firewall modules in an exemplary embodiment. As illustrated in FIG. 9, the controller 28 pushes the designated configurations to the SD cloud gateway modules 22 and 26. The designated configurations include data such as IP addresses, bandwidth capacity, and routing configuration for the virtual router and ACLs allowed or banned and the IP addresses of ports and apps for the firewall 92. The designated configuration is deployed once and the corresponding CSP 18 provides additional network connectivity as needed.

While example embodiments of systems and method for creating a network-agnostic, dynamic, on demand, software defined, policy based cloud connectivity gateway have been described in connection with various computing devices/processors, the underlying concepts may be applied to any computing device, processor, or system capable of facilitating cloud connectivity. The various techniques described herein may be implemented in connection with hardware or software or, where appropriate, with a combination of both. Thus, the methods and apparatuses for providing connectivity to cloud resources, or certain aspects or portions thereof, may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal, a transient signal, or a propagating signal. Rather, the computer-readable storage medium as described herein is an article of manufacture. When the program code is loaded into and executed by a machine, such as a computer, the machine becomes an apparatus for facilitating cloud connectivity as described herein. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses associated with providing cloud connectivity as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for providing cloud connectivity as described herein. When implemented on a general-purpose processor, the program code combines with the processor to provide a unique apparatus that operates to invoke the provision of cloud connectivity as described herein.

While systems and methods for the provision of cloud connectivity have been described in connection with the various embodiments of the various figures, it is to be understood that other similar embodiments may be used or modifications and additions may be made to the described embodiments of systems and methods for the provision of cloud connectivity without deviating therefrom. For example, one skilled in the art will recognize that systems and methods for the provision of cloud connectivity as described in the instant application may apply to any environment, whether wired or wireless, and may be applied to any number of such devices connected via a communications network and interacting across the network. Therefore, systems and methods for the provision of cloud connectivity as described herein should not be limited to any single embodiment, but rather should be construed in breadth and scope in accordance with the appended claims.

What is claimed:

1. A method of simultaneously connecting a customer data network to multiple cloud service providers via a data network based on predefined user-defined policies, said data network comprising a plurality of software defined network controllers control data flow over said data network, a customer software defined cloud gateway connects the customer data network to at least one of said plurality of software defined network controllers, and a plurality of cloud software defined cloud gateways connects each of said multiple cloud service providers to at least one of said plurality of software defined network controllers, the method comprising:
   receiving customer-selected policy and configuration data; and
   providing said customer-selected policy and configuration data to said customer software defined cloud gateway, said cloud software defined cloud gateways, and said plurality of software defined network controllers to configure said customer software defined cloud gateway, said cloud software defined cloud gateways, and said plurality of software defined network controllers to create respective virtual networks controlled by the customer-selected policy data between said customer data network and at least two of the multiple cloud service providers, wherein said customer-selected policy is a time-based policy that dynamically allocates data traffic between said at least two of the multiple cloud service providers at one or more specified times.

2. The method as in claim 1, wherein receiving customer-selected policy and configuration comprises receiving configuration data for said customer software defined cloud gateway, said configuration data including at least a bandwidth capacity and bandwidth consumption model of a connection between said customer data network and said data network.

3. The method as in claim 1, wherein receiving customer-selected policy and configuration data comprises receiving configuration data for each of said cloud software defined cloud gateways, said configuration data including at least a bandwidth capacity and bandwidth consumption model of a connection between a corresponding cloud service provider and/or cloud network and said data network.

4. The method as in claim 1, wherein receiving customer-selected policy and configuration data comprises receiving cloud usage policy data for each cloud service provider and/or cloud network and provide the cloud usage policy data to said customer software defined cloud gateway, said cloud software defined cloud gateways, and said software defined network controllers.

5. The method as in claim 1, wherein the customer-selected policy data includes cloud service provider or cloud network selection and bandwidth selection, further comprising using the customer-selected policy data to configure the data network to divide simultaneous data traffic from the customer data network across multiple cloud service providers or cloud networks with the same policy data.

6. The method as in claim 1, wherein the customer-selected configuration data includes IP addresses, bandwidth capacity and routing configuration, further comprising providing the customer-selected configuration data to a virtual router of said customer software defined cloud gateway and/or said cloud software defined cloud gateways.

7. The method as in claim 1, wherein the customer-selected configuration data includes access control lists, allowed and/or banned IP addresses, ports, and application data, further comprising providing said customer-selected configuration data to a virtual firewall of said customer software defined cloud gateway and/or said cloud software defined cloud gateways.

8. The method as in claim 1, wherein the time-based policy specifies a time-based bandwidth capacity.

9. A non-transitory computer readable storage medium comprising instructions that when executed by a processor cause said processor to implement a method of simultaneously connecting a customer data network to multiple cloud service providers via a data network based on predefined user-defined policies, said data network comprising a plurality of software defined network controllers control data flow over said data network, a customer software defined cloud gateway connects the customer data network to at least one of said plurality of software defined network controllers, and a plurality of cloud software defined cloud gateways connects each of said multiple cloud service providers to at least one of said plurality of software defined network controllers, said instructions:

receiving customer-selected policy and configuration data; and providing said customer-selected policy and configuration data to said customer software defined cloud gateway, said cloud software defined cloud gateways, and said software defined network controllers to configure said customer software defined cloud gateway, said cloud software defined cloud gateways, and said software defined network controllers to create respective virtual networks controlled by the customer-selected policy data between said customer data network and at least two of the multiple cloud service providers, wherein said customer-selected policy is a time-based policy that dynamically allocates data traffic between said at least two of the multiple cloud service providers at one or more specified times.

10. The computer readable storage medium as in claim 9, wherein the instructions further comprise instructions for receiving cloud usage policy data for each cloud service provider and/or cloud network and providing the cloud usage policy data to said customer software defined cloud gateway, said cloud software defined cloud gateways, and said software defined network controllers.

11. The computer readable storage medium as in claim 10, wherein the cloud usage policy data includes time-based policy enforcement data, further comprising instructions for providing said time-based policy enforcement data to said customer software defined cloud gateway, said cloud software defined cloud gateways, and said software defined network controllers to enable dynamic changing of connectivity to said multiple cloud service providers based on time interval.

12. A device, the device comprising:
a processor; and
a memory coupled with the processor, the memory storing executable instructions that when executed by the processor, cause the processor to effectuate operations comprising:
receiving customer-selected policy and configuration data; and
providing the customer-selected policy and configuration data to a customer software defined cloud gateway, cloud software defined cloud gateways, and software defined network controllers to configure the customer software defined cloud gateway, the cloud software defined cloud gateways, and the software defined network controllers to create respective virtual networks controlled by the customer-selected policy data between a customer data network and at least two cloud service providers of a multiple of cloud service providers, wherein said customer-selected policy comprises a time-based policy that dynamically allocates data traffic between said at least two cloud service providers of a multiple of cloud service providers at one or more specified times.

13. The device of claim 12, wherein the processor further effectuates operations comprising providing said customer-selected policy and configuration data to a controller.

14. The device of claim 13, the operation further comprising enabling a configuration selection for a customer software defined cloud gateway, said configuration including at least a bandwidth capacity and bandwidth consumption model of a connection between said customer data network and said data network.

15. The device of claim 13, the operation further comprising enabling a configuration selection for each of a plurality of cloud software defined cloud gateways, said configuration including at least a bandwidth capacity and bandwidth consumption model of a connection between a corresponding cloud service provider and cloud network and said data network.

16. The device of claim 13, the operation further comprising enabling a cloud usage policy selection for each cloud service provider and cloud network and providing the customer-selected policy data to a customer software defined cloud gateway, a plurality of cloud software defined cloud gateways, and a plurality of software defined network controllers.

17. The device of claim 12, the operation further comprising enabling a customer software defined cloud gateway, a plurality of cloud software defined cloud gateways, and a plurality of software defined network controllers and configuring the data network to divide simultaneous data traffic from the customer data network across multiple cloud service providers with the same policy data.

18. The device of claim 12, wherein the customer-selected configuration data comprises IP addresses, a bandwidth capacity and a routing configuration and is provided to a virtual router of a customer software defined cloud gateway and a plurality of cloud software defined cloud gateways.

19. The device of claim 12, wherein the customer-selected configuration data comprises access control lists, allowed and banned IP addresses, ports, and application data, and is provided to a virtual firewall of a customer software defined cloud gateway and/or a plurality of cloud software defined cloud gateways.

20. The device of claim 12, wherein the time-based policy specifies a time-based bandwidth capacity.

* * * * *